United States Patent

[11] 3,619,254

[72] Inventor Frederick Davis
 Pittsburgh, Pa.
[21] Appl. No. 808,319
[22] Filed Mar. 18, 1969
[45] Patented Nov. 9, 1971
[73] Assignee Liquid Crystal Industries
 Turtle Creek, Pa.

[54] THERMOMETRIC ARTICLES AND METHODS FOR PREPARING SAME
15 Claims, No Drawings

[52] U.S. Cl. .................................................. 117/72,
 23/230 LC, 117/33.3, 117/38, 117/73, 117/75,
 117/76 P, 117/76 T, 117/76 F, 117/81, 117/87,
 161/410, 252/408, 350/160 P
[51] Int. Cl. ..................................................... B44d 1/14,
 G01k 11/16

[50] Field of Search.......................................... 252/408;
 23/230 LC; 161/410; 350/160 P; 117/72, 33.3, 81,
 87

[56] References Cited
UNITED STATES PATENTS
3,114,836 12/1963 Fergason et al............... 350/160 P X
3,401,262 9/1968 Fergason et al............... 350/160 P
3,410,999 11/1968 Fergason et al............... 23/230 LC X Primary Examiner—William D. Martin
Assistant Examiner—Ralph Husack
Attorney—Cooper, Dunhour, Henninger & Clark ABSTRACT: Thermometric articles comprising a substrate, a coating of a cholesteric composition on the substrate, and a coating of a solid on the cholesteric composition, the solid being immiscible and unreactive with the cholesteric composition; and methods for preparing such articles.

THERMOMETRIC ARTICLES AND METHODS FOR PREPARING SAME

BACKGROUND OF THE INVENTION

Mesomorphic or "liquid crystalline" materials have long been known and have been classified into three types: smetic, nematic, and cholesteric. Cholesteric substances which change optical properties as a function of temperature are well known and are sometimes referred to as thermotropic materials. Many of these materials are also quite sensitive to the presence of other substances, and such compositions are said to be lyotropic because they change their optical properties considerably as a result of being exposed to substances with which they exhibit solvation effects.

In many applications it is desired that the cholesteric material cholesteric only to temperature changes, and it is accordingly desired that such materials be protected from fortuitous contact with extrinsic substances. In many uses of cholesteric materials, thin layers are spread upon a substrate in connection with measuring the temperature of the substrate and then used in that condition. Such cholesteric materials lose their thermotropic properties at a greater or lesser rate and must be replaced.

In some devices where cholesteric compositions are employed to respond to temperature changes, the compositions are maintained under vacuum conditions so as greatly to extend their useful life. It is of course not practical to maintain ordinary thermometric articles under vacuum conditions, and where the article comprises a relatively thin film of cholesteric composition which is not to be used immediately, the article is frequently unusable at the time the need for it arises. Moreover, where a cholesteric thermosensitive composition is to be used in an environment, such as measuring the temperature of a liquid, where contact immediately destroys the desirable properties of the cholesteric composition, such compositions cannot be utilized at all.

THE INVENTION

Briefly, the present invention provides thermosensing articles which can be prepared and then maintained for an indefinite time, as well as articles which will continue to function in a hostile environment. Such thermosensing articles comprise a base or a substrate, a layer of a cholesteric composition on the substrate, and a solid material coated on the cholesteric composition, the solid material being chemically inert to, and immiscible with, the cholesteric substance. Since the solid substance used to coat the cholesteric composition may itself be susceptible to attack by moisture or other ambient vapors and gases, in certain aspects of the present invention a protective overcoating of a second solid material is also employed. Methods for preparing such articles are also contemplated herein.

The known cholesteric compositions are organic substances which are oily in nature. Attempts have been made to coat films of such compositions with various lacquers, varnishes, and the like, but such attempts radically alter or totally destroy the cholesteric compositions and their color play properties. Accordingly, because of the poor reproducibility of such thin films of coated cholesteric compositions, they have been unsuccessful for most practical applications.

It has surprisingly been found according to the present invention that the incompatibility of aqueous coating substances and the cholesteric compositions can be overcome and that cholesteric compositions can be coated with a film which does not alter their properties. The substrate is coated with a film of cholesteric material, as more fully described hereinafter, and then with a viscous liquid, solid-forming, lipophobic composition, this composition being immiscible with and inert to the cholesteric composition. After coating on the cholesteric composition, the lipophobic composition is rapidly given an initial set by evaporating the aqueous vehicle or polymerizing the solids with infrared radiation or conduction such as direct contact, a hot air blast, or the like and then the drying and setting of the composition to a solid is completed.

The substrate upon which the cholesteric composition is deposited is of course inert to the cholesteric material. The substrate can be a solid material of considerable thickness so as to be rigid or it can be of lesser thickness and/or of materials chosen so as to provide a flexible substrate. If the relatively thick material upon which it is desired to deposit the composition is not itself inert, such material can be overcoated with an inert material to provide the substrate according to the invention, and the solid will then provide a base for the combination.

Exemplary of substrates upon which the cholesteric composition can be coated are organic polymers such as nylon, phenolic resins, cellulose esters, e.g., cellulose acetate, cellulose butyrate, cellulose acetate-butyrate, and the like, polyolefins such as polyethylene, polypropylene, and the like, polyhalohydrocarbons such as polytetrafluoroethylene, polychlorotrifluoroethylene, and the like, polystyrene, acrylic resins such as methyl methacrylate and the like, polyesters such as polyethylene terephthalate and the like, vinyl resins such as polyvinylidene chloride, polyvinyl chloride, natural and synthetic rubbers and other elastomers, metals, glasses, ceramic materials and the like.

By employing as the substrate a coating of a polymer such as nylon, a polyolefin, cellulose ester, vinyl polymer, or other similar materials as set forth above, solids such as paper, nonwoven textiles, fabrics, and like materials which would absorb or react with the cholesteric composition can be used as bases in the practice of this invention. For better optical properties, it is frequently preferred that the substrate and/or base be of a low reflectance color such as black. Alternatively, the substrate and/or base can be transparent and the overcoating or final protective coating can be of such low reflectance color. In this case, the cholesteric color play will be viewed through the substrate and/or base.

As used herein, a cholesteric composition is one comprising at least one substance which exists in the cholesteric state at a certain temperature or over a range of temperatures. The cholesteric state is manifested by the material being optically negative, having strong rotatory power, scattering white light to give vivid colors (or monochromatic light to give gradation of lightness and darkness), and displaying circular dichroism. This state is found in many substances and occurs between the temperature at which the substance is a solid and the temperature at which the substance becomes a true liquid and has isotropic optical properties.

The cholesteric mesomorphic state is exhibited by a variety of materials, many of which are derivatives of cholesterol, although some noncholesteryl substances such as optically active amylcyanobenzylidineaminocinnamate also can exist in the cholesteric state. Alkanoic and aralkanoic esters of cholesterol and alkyl esters of cholesteryl carbonate have been found to be particularly useful, such alkyl and alkanoic groups containing from one to 24 or more carbon atoms in the molecule. Esters of cholesterol and its derivatives containing from nine–22 carbon atoms in the alkanoic group or a benzenoid ring and one–three carbon atoms in the alkyl portion of the aralkanoic group are particularly useful in many embodiments, as are alkyl esters of cholesteryl carbonate containing one–20 carbon atoms in the alkyl group. Such useful substances include cholesteryl nonanoate, cholesteryl caprylate, cholesteryl laurate, cholesteryl palmitate, cholesteryl stearate, cholesteryl arachidate, cholesteryl behenate, cholesteryl oleate, cholesteryl linoleate, cholesteryl linolenate, methyl cholesteryl carbonate, butyl cholesteryl carbonate, oleyl cholesteryl carbonate, stearyl cholesteryl carbonate, cholesteryl benzoate, cholesteryl cinnamate, and the like.

It will be understood from the present description that the cholesteric composition can comprise one cholesteric substance or additionally contain other materials capable of existing in the cholesteric phase, together with noncholesteric adjuvant materials added for their particular effect on the composition. Thus, a plurality of cholesteric substances can be present for the purpose of obtaining a color change over a selected temperature range. For instance, cholesteryl nonanoate can be admixed with oleyl cholesteryl carbonate to adjust the color play temperature range to any temperature range from 20° to 70° C., e.g., 35–36° C. It has also been recently discovered that certain materials can be added to prevent reversion of a cholesteric composition to the cholesteric state after the composition has been exposed to a temperature at which it leaves said state, as described in my copending application Ser. No. 808,111 filed on even date herewith, and entitled "Thermometric Compositions and Articles." It will be appreciated that such compositions can have great utility for thermosensing articles which will maintain a record of a temperature change for an extended period of time.

The cholesteric composition is preferably deposited on the substrate or substrate and base combination as a thin film or layer. It will be appreciated from the present description that the cholesteric composition can be placed in a square, rectangular, other polygonal, round, elliptical, or other geometric figure such as numerals, letters, symbols and the like, depending upon the type of thermosensing device required. For example, a cholesteric composition, which would leave the cholesteric state and cease to disperse light as the temperature was raised, could be deposited on the substrate in a pattern of the letters "SAFE" so that the failure of the letters to be apparent would indicate that the article had been overheated.

The cholesteric composition can be applied to the substrate in any convenient manner. For example the composition can be coated or deposited on the substrate by silk screening, letterpress, printing, lithography, offset, spraying, pouring, brushing, with a doctor blade and/or roller mill, or by other conventional methods. The thickness of the first coating should be sufficient to permit observation of the color play, but excessive thicknesses cause problems in production and are wasteful of cholesteric composition. A desirable range of thickness is 10 microns to 10 mils (0.25 mm). It is preferred in many aspects of this invention that the cholesteric composition be from 0.5 to 5 mils thick.

The immiscible coating for the cholesteric material is lipophobic, but it has surprisingly been found that such materials provide a useful protective layer for the cholesteric composition despite the usual incompatibility of the two types of materials. The lipophobic coating is applied in the form of a viscous liquid which will form a solid material. The viscosity of such a liquid is higher than that of water, but it is desirably thin enough that it can readily be flowed onto the surface or used to dip, spray, or otherwise deposit a uniform coating on the cholesteric composition. The viscosity should not be so low as to spread unduly in the short setting time required. Setting time as used herein means the time required for the lipophobic coating to exhibit some initial stiffness by formation of an integument of dried or polymerized material on top of or stiffness within the layer.

The coating composition should be inert to, that is, not chemically reactive with, the cholesteric composition. The coating composition is also solid-forming, that is, it dries by loss of water or other lipophobic vehicle or polymerizes or cross-links to provide a material which is not liquid or vaporous. The coating, while solid, is preferably not rigid, but will exhibit at least as much flexibility as the substrate or substrate-base combination, so that the coating will not crack under any flexure which the substrate permits.

As noted above, the lipophobic coating material forms a solid by loss of water or other vehicle and/or by formation or cross linking of a polymer. Solutions, suspensions, emulsions, or dispersions of the solids or the solid-forming materials can be applied to the surface of the cholesteric composition. The coating can thus be carried out with casein adhesives, polymer emulsions such as acrylic acid polymer and the like, polyvinyl alcohol, cellulose esters such as cellulose acetate and the like, cellulose ethers such as carboxymethylcellulose, and the like. Solutions, dispersions, suspensions and emulsions of these materials generally have sufficient viscosity to satisfy this criterion. The aqueous liquid form in which such materials are applied can contain from about 0.25 to about 50 percent or more solids, but it is preferred that the lipophobic coating comprise from 0.5 to ten percent solids.

The immiscible solids can be coated on the layer of cholesteric composition by printing, spraying, brushing, the use of a doctor blade, or any similar technique. When the cholesteric composition is to be viewed through the coating, it must be light-transmitting, that is transparent, or at least translucent, to visible light in the thickness used. It will be understood that the coating must also be thick enough to prevent undue penetration and attack of the cholesteric composition by extraneous substances. On the other hand, it is desirable that the coating also be relatively flexible so that it will not crack or otherwise fail and permit access to the cholesteric composition. It is accordingly preferred that such coatings be at least ¼ mil thick, but there is usually little advantage in having a coating thicker than 20 mils. Generally a 2 to 10 mil thickness is preferred.

In a further aspect, the present invention also contemplates articles which are overcoated with a substance to protect the immiscible solid. Such substances can include nylon, solid waxy polyethylene glycols, phenolic resins, polyolefins and polyhaloolefins, acrylic or other vinylic and vinylene polymers, and the like. These overcoating substances can be applied by the same techniques as set forth above for the solids used to protect the cholesteric composition. It is preferred that these overcoating materials be applied in sufficient thickness to protect the immiscible solid from ambient vapors and gases, but not so thick as to adversely affect flexibility or produce cracking or crazing. Accordingly, it is preferred that the overcoating be from ½ mil to 5 mils thick.

In embodiments of this invention wherein the cholesteric composition is viewed through a transparent or translucent substrate or substrate-base combination, the immiscible solid coating and the protective overcoating need not be light-transmitting. In fact, it is desirable in such articles that at least one of the coatings contain a substance to make the coating opaque. Suitable agents for providing the desired dark background include various carbon materials such as gas black, lamp black, and the like as well as finely comminuted metals and metallic compounds such as particulate magnetic iron oxide. It is preferred that the opacity additive be incorporated in the immiscible solid layer.

The following examples are given to illustrate embodiments of the invention as it is presently preferred to practice it. It will be understood that these examples are illustrative, and the invention is not to be considered as restricted thereto except as indicated in the appended claims.

EXAMPLE I

A 10-mil black polyvinyl chloride sheet is silk-screened with a cholesteric composition to provide a one mil thickness of composition on the sheet in patterns of squares about one-sixteenth inch on a side with nine such squares per unit of the pattern. The cholesteric composition is a mixture of 25 parts of cholesteryl chloride having a melting point of 94–95° C., 30 parts of cholesteryl oleyl carbonate showing a color play at 5–6° C., 39 parts of cholesteryl oleyl carbonate showing a color play between 20–22° C., and 6 parts of Solvent Black 7 NJD, made by Allied Chemical. This material changes from a green color to a colorless condition at a temperature of 37° C.

The silk-screened sheet is then fed into a coating machine having a vacuum backing to hold the sheet to a cylinder as it is passed through an aperture 15 mils in height. A white casein glue is flowed onto the silk-screened sheet to provide an overall coating thickness of about 5 mils on the sheet. As the coated sheet is withdrawn from the aperture, it is heated on the surface by a hot air blast and by infrared radiation rapidly to set the casein. The sheet is then dried for 5 minutes.

The dried sheet bearing the cholesteric composition and the casein coating is sprayed with acrylic lacquer to provide a protective overcoating 2 mils thick. The sheet is then cut into strips so that each one contains a unit of 9 squares of the cholesteric composition.

These rectangular strips are then placed in a patient's mouth so that the cholesteric composition is subject to the oral temperature. The strip is withdrawn and if the squares on the strip show a green color, the patient's temperature is not above 37° C. If the squares are colorless, the patient's temperature is above 37° C.

EXAMPLE II

An 11-by-4 inch sheet of cellulose acetate butyrate is silk-screened with a cholesteric composition comprising 45 parts of cholesteryl oleyl carbonate, 45 parts of cholesteryl nonanoate, and 10 parts of cholesteryl benzoate (having a color play range of 26.5–30.5° C.) in the form of an array of ⅛-inch squares.

The silk-screened sheet is then fed into a coating machine as described in example I so that it is coated with white casein glue blackened by the addition of 20 percent carbon black. The coating is dried rapidly with heat and infrared radiation. The dried coating is then overcoated with acrylic lacquer as in example I.

The finished sheet has a color play temperature range of 26.5–30.5° Φ C. so that when a hand is placed on either surface of the sheet a vivid change of colors takes place. At the lower temperatures, the cholesteric composition squares are bright red and as the temperature increases they pass through orange, yellow, green, and blue to a deep violet. At higher temperatures the colors entirely disappear.

EXAMPLE III

A 10-mil black polyvinyl chloride sheet is sprayed through a mask with the cholesteric composition set forth in example I to form a pattern of various geometric Figures. The sheet is then coated with casein glue, dried, and overcoated with acrylic lacquer as in example I to provide a large panel which loses its green color when heated to 37° C. The color does not return spontaneously, but the green color can be restored by briefly rubbing the acrylic surface.

EXAMPLE IV

A 1-mil thick black nylon sheet is printed with a dot pattern of the cholesteric composition of example II on a small printing press. The thickness of the cholesteric dots is one mil. The printed sheet is then coated with white casein glue as in example I, dried, and overcoated with acrylic lacquer.

The dots show a color play at 26.5°–30.5° C.

EXAMPLE V

Example II is repeated using "Liquitex" acrylic polymer emulsion flatted with colloidal silica, and a similar thermosensing article is obtained.

EXAMPLE VI

Example II is repeated using a mixture of 25 percent "Liquitex" acrylic polymer emulsion and 75 percent casein glue, and a similar thermosensing article is obtained.

EXAMPLE VII

A strip of 5-mil black polyvinyl chloride is silk-screened with the cholesteric composition of example II and dipped in white casein glue. The glue is rapidly dried by infrared radiation and held for an additional five minutes. It is then overcoated with acrylic lacquer spray as in example I to provide a thermosensing article.

What is claimed is:

1. A thermosensing article comprising a substrate, a layer of a cholesteric composition on the substrate, and a solid protective coating on the cholesteric composition derived from a viscous, liquid, film-forming lipophobic material immiscible with and inert to said composition.

2. An article according to claim 1 wherein the immiscible material is overcoated with a solid polymer film which is insoluble in water.

3. An article as in claim 2 wherein the immiscible material is casein glue and the solid polymer is an acrylic resin.

4. An article according to claim 1 wherein the substrate is an organic polymer film adhering to a solid base.

5. An article according to claim 4 wherein the substrate is of low reflectance.

6. An article according to claim 4 wherein the base is of low reflectance.

7. An article according to claim 1 wherein the immiscible material is light-transmitting.

8. An article according to claim 1 wherein the substrate is light-transmitting and the immiscible material is opaque.

9. A process for preparing thermosensing articles comprising coating a first layer of a cholesteric composition on a substrate, coating a second layer of a viscous liquid, film-forming lipophobic composition immiscible with said cholesteric composition on said first layer and allowing said lipophobic composition to dry, wherein said first layer is 10 microns to 10 mils thick and said second layer is at least ¼-mil thick.

10. A process according to claim 9 wherein the first layer is 0.5 to 5 mils thick and the second layer is 2 to 10 mils thick.

11. A process according to claim 9 wherein the second layer is rapidly heated to form at least a thin film of solid material on said first layer.

12. A process according to claim 11 wherein the second layer is cured after the rapid heating until it is fully set.

13. A process according to claim 12 wherein the cured second layer is coated with a solid polymer protective layer.

14. A process as in claim 13 wherein the cured second layer is casein glue and the protective layer is an acrylic resin.

15. A process according to claim 9 wherein the second layer is covered with a solid polymer protective layer.

* * * * *